(12) United States Patent
Adkins

(10) Patent No.: US 8,444,293 B2
(45) Date of Patent: May 21, 2013

(54) METHOD AND KIT FOR RETROFITTING FLUORESCENT LIGHT FIXTURES

(76) Inventor: Thomas W. Adkins, Toledo, OH (US)

(*) Notice: Subject to any disclaimer, the term of this patent is extended or adjusted under 35 U.S.C. 154(b) by 323 days.

(21) Appl. No.: 12/802,829

(22) Filed: Jun. 15, 2010

(65) Prior Publication Data

US 2010/0315809 A1    Dec. 16, 2010

Related U.S. Application Data

(60) Provisional application No. 61/268,792, filed on Jun. 16, 2009.

(51) Int. Cl.
*F21V 4/00* (2006.01)

(52) U.S. Cl.
USPC .......................................... 362/225; 362/219

(58) Field of Classification Search
USPC ................. 362/217.01, 225, 219, 220–223
See application file for complete search history.

(56) References Cited

U.S. PATENT DOCUMENTS

| 4,763,233 | A | * | 8/1988 | Poyer | 362/477 |
| 6,153,984 | A | * | 11/2000 | Fishbein et al. | 315/291 |
| 7,163,310 | B2 | * | 1/2007 | Sanborn et al. | 362/133 |
| 2002/0118537 | A1 | * | 8/2002 | Segretto | 362/226 |
| 2007/0115654 | A1 | * | 5/2007 | Ruben | 362/221 |
| 2010/0053957 | A1 | * | 3/2010 | Pawelko et al. | 362/235 |

\* cited by examiner

*Primary Examiner* — Julie Shallenberger

(74) *Attorney, Agent, or Firm* — Emch, Schaffer, Schaub & Porcello, Co., L.P.A.

(57) ABSTRACT

Retrofit lighting kits allow for the reuse of fluorescent lighting fixture housings, already in place, while retrofitting new assemblies that increase efficiency, reduce energy consumption and demand, and reduce ongoing maintenance costs. The advantage of one retrofit kit is to quickly replace inefficient T-12 and T-8 ceiling mount 2 bulb fixtures, with a higher quality, and more efficient lighting source, while concurrently lowering the cost of operation, and maintenance. The advantage of another retrofit kit allows the installation of compact fluorescent lamps, of several sizes and configurations, to quickly replace the inefficient T8 and T12 lamps and service equipment, used in troffer style fixtures. Deployment of these kits, reduces electrical usage, eases servicing of the fixture, and reduces heat buildup in the fixture.

2 Claims, 14 Drawing Sheets

US 8,444,293 B2

METHOD AND KIT FOR RETROFITTING FLUORESCENT LIGHT FIXTURES

This application claims the benefit of provisional patent application Ser. No. 61/268,792, filed Jun. 16, 2009.

BACKGROUND OF THE INVENTION

Commercial and industrial fluorescent light fixtures are inefficient to operate and require significant maintenance cost. In the past, replacing such light fixtures required the removal and replacement of the fixture. Depending on the way the fixture is installed, significant remodeling cost can also be incurred to repair the ceiling area where the fixtures were removed. The high cost associated with replacing these fixtures often exceeds the cost benefits of replacement, to the point where it is not economically feasible to replace the fixtures. Accordingly, there is a need for a low cost replacement method and kit that allows for upgrading such fixtures to more efficient lighting systems, with reduced maintenance cost. The method and kit need to allow the main fixture housing and the input wiring from the fluorescent fixture, to be retained to reduce installation and remodeling costs, associated with the replacement of such fixtures.

SUMMARY OF THE INVENTION

The present invention is directed to a concept and method that allows for the reuse of one, two or more existing fluorescent lighting fixture housings already in place, while retrofitting new assemblies that increase efficiency, reduce energy consumption and demand, and reduce ongoing maintenance costs.

In the first configuration, a new fixture cover design allows for the direct mounting of T-5 (4 foot nominal) tubes, to the original fixture housings, with the original housing still remaining in place. The assembly can provide a similar or increased light level. The replacement products of the invention gives the advantage of quickly replacing old inefficient linear strip style fluorescent dual lamp fixtures, with a higher quality and more efficient lighting source, while concurrently lowering the cost of operation, and maintenance. In addition, in this configuration, inefficient fixture ballasts are replaced with one electronic ballast, which can serve one, two or more fixtures. The replacement covers can be configured and customized in a number of ways including, but not limited to, holding varying lamp lengths, wattages, quantities, configurations, different finishes, seals, covers, and placement of lamps to improve aesthetics and/or performance.

In a second configuration of this invention, older troffer style fixtures, used primarily in office suspended ceiling environments, and often referred to as "drop in" fixtures, can be retrofitted with a lighting system comprised of compact fluorescent lamps placed in channels and sockets, to reduce operating costs and maintenance.

Other objects and advantages of the present invention will become apparent to those skilled in the art upon a review of the following detailed description of the preferred embodiments and the accompanying drawings.

IN THE DRAWINGS

DETAILED DESCRIPTION OF THE INVENTION

A kit and method is disclosed to retrofit commercial and industrial fluorescent light fixtures using the T12 F96 and T8 F96 (8 foot) dual lamp technology, with T5 nominal 4 foot 54 watt high output tubes, using just two lamps, mounted end to end, on two new replacement fixture cover plates, with customized attachments and connectors. The features of the invention will be more readily understood by reference to the attached drawings and the descriptive material.

Figure 1:
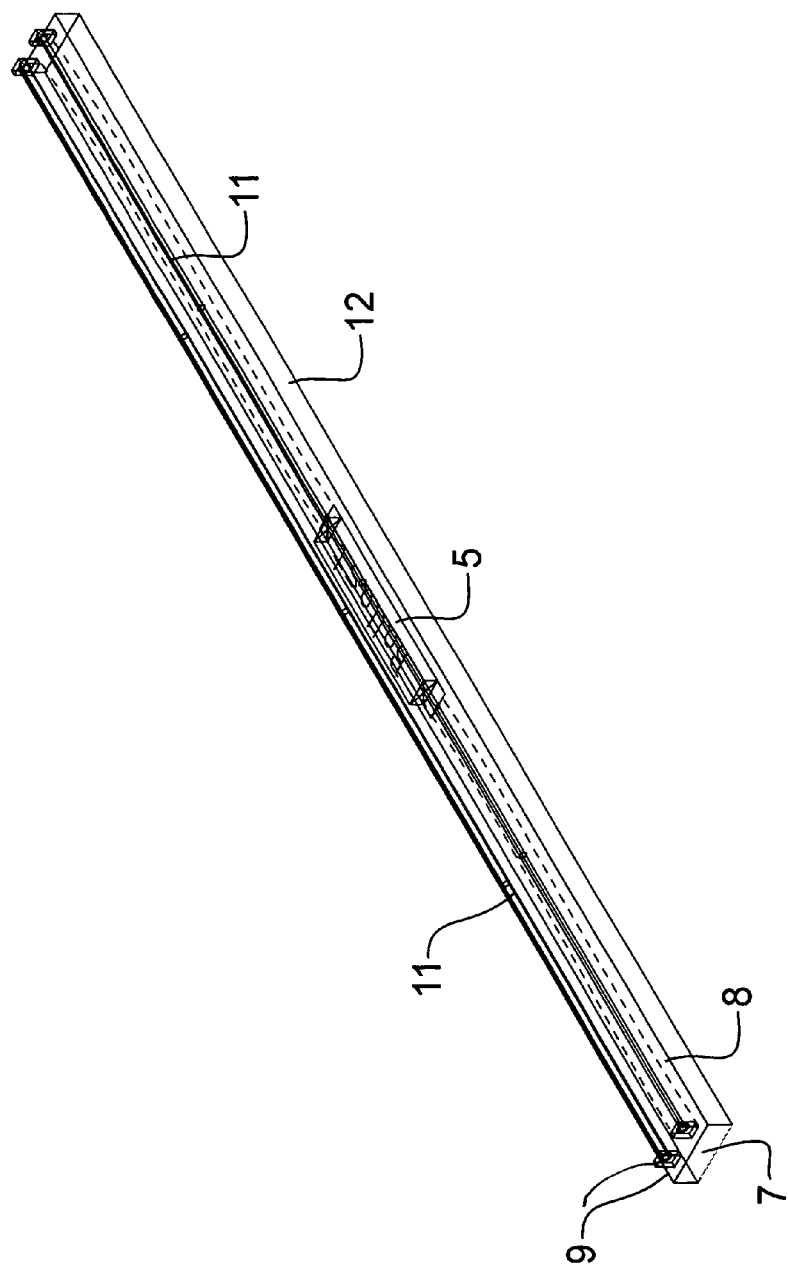
FIG. 1 is a perspective view of a prior art fluorescent light fixture.
Figure 2:
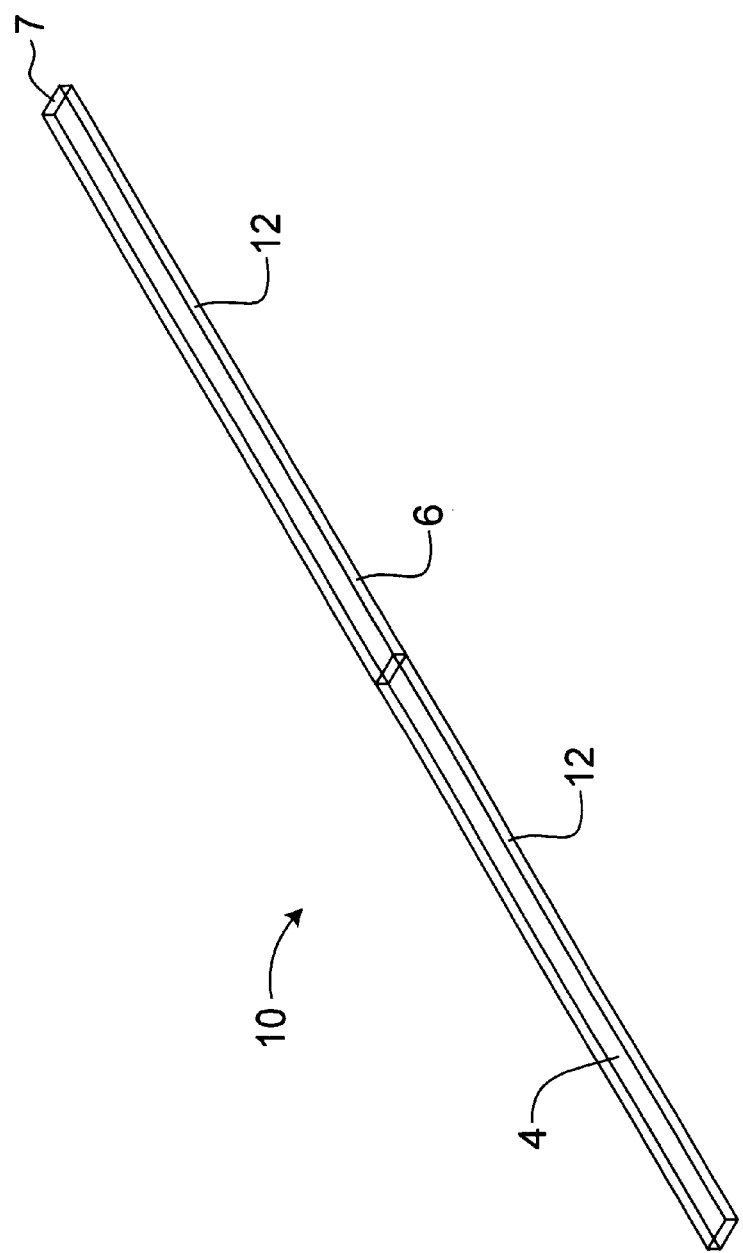
FIG. 2 is a perspective view of prior art fluorescent light fixture with the components removed.

The present invention for a replacement kit 10 as shown in FIGS. 1-4 relates to a kit and method to retrofit commercial and industrial fluorescent light fixtures 12. The light fixtures 12 have a pair of T12 or T8 fluorescent bulbs 11 that are connected to pin sockets 9. The pin sockets and fluorescent bulbs are mounted on the top panel 8 a fixture box 7. A ballast 5 is positioned in the fixture box 7 beneath the top panel 8 the fluorescent bulbs 11. The ballast 5 is connected to a source of electricity and is used to power the two fluorescent bulbs 11. To use the kit of the present invention, the top panel 8, ballast 5, pin sockets 9 and fluorescent bulbs 11 are removed from the light fixture 12. This leaves an empty fixture box 7 as shown in FIG. 2.

Figure 3:
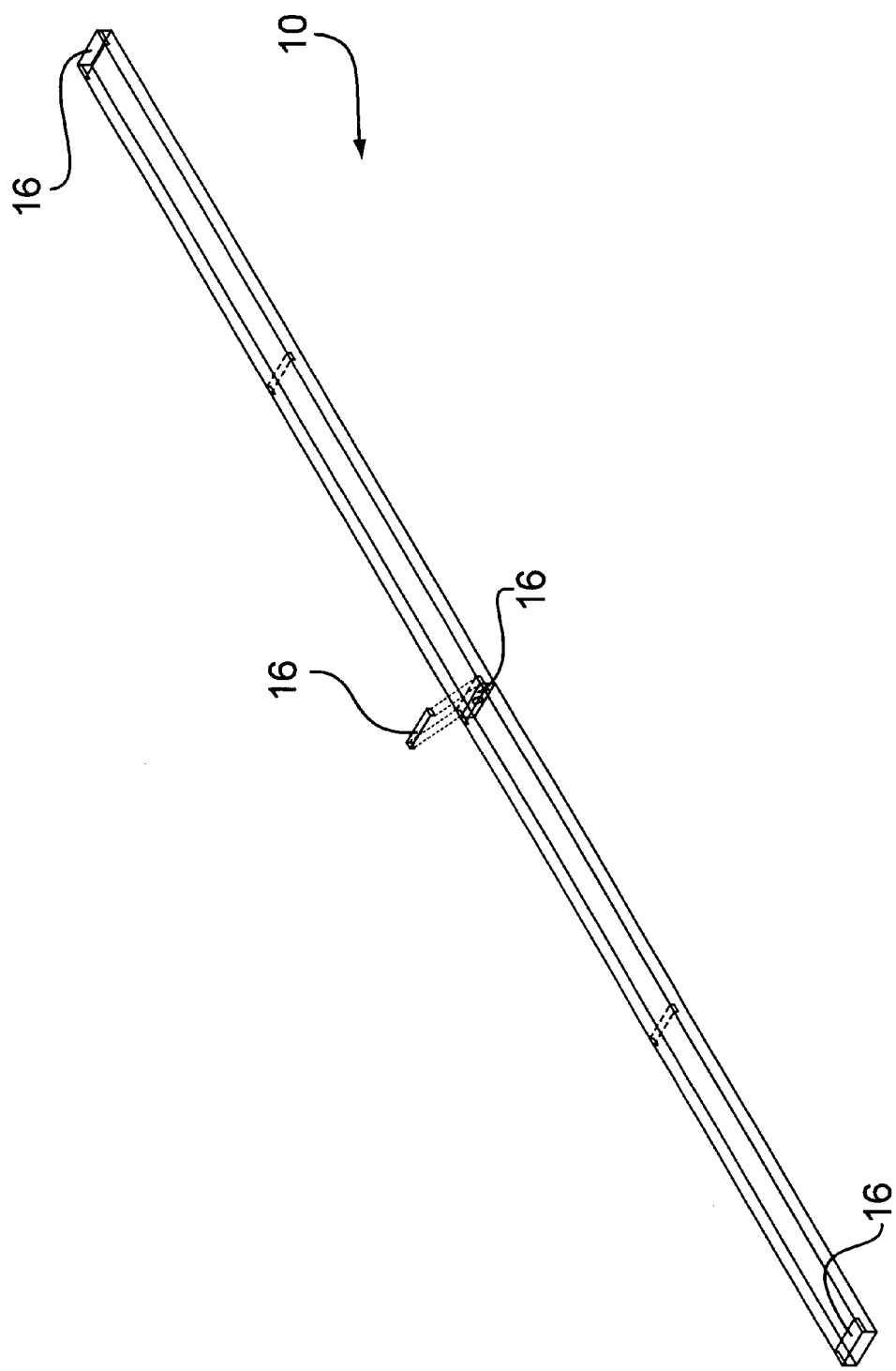
FIG. 3 is a perspective view of a partially assembled light fixture of the present invention.
Figure 4:
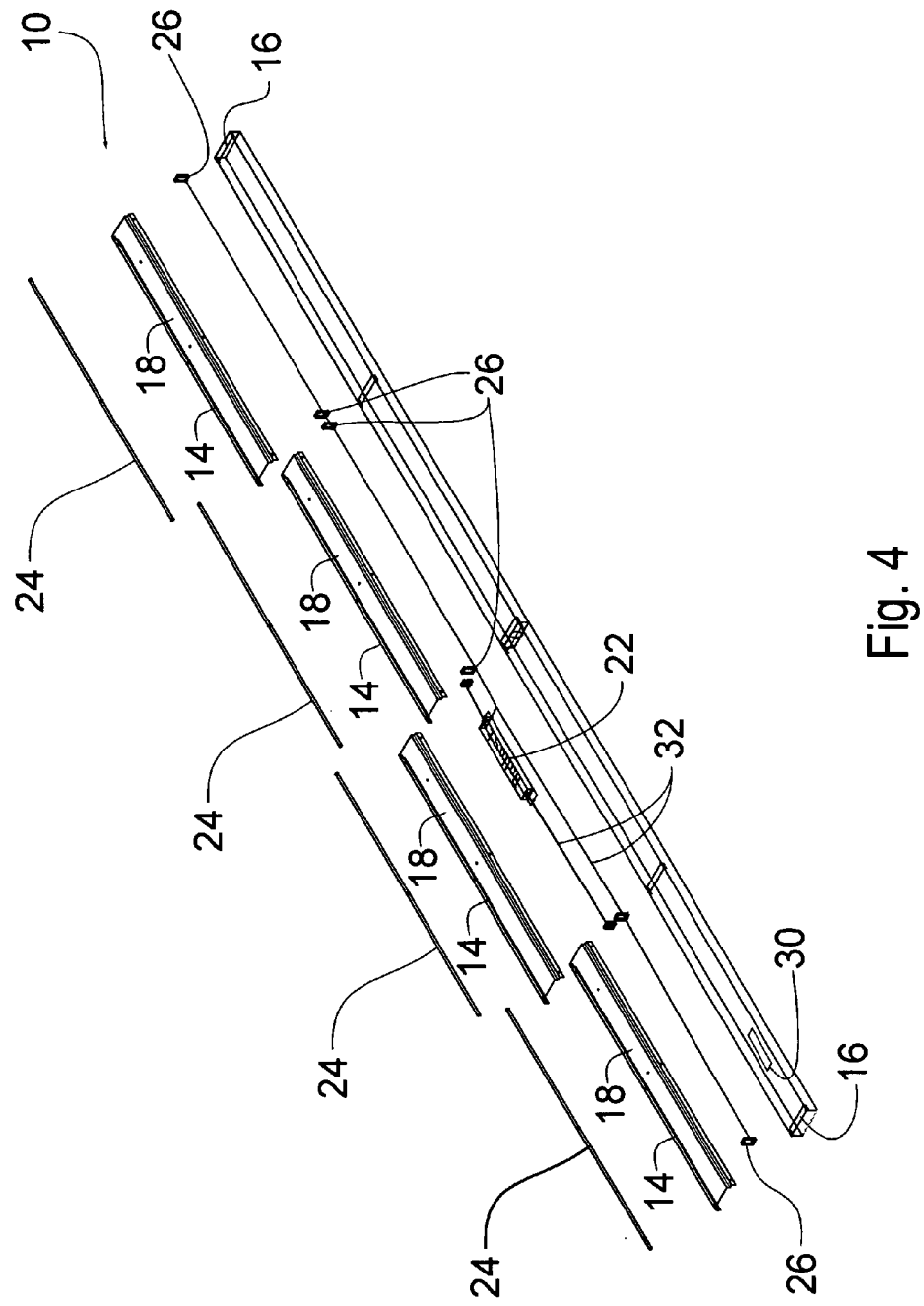
FIG. 4 is an, exploded perspective view of the light fixture of the present invention.

The retrofit kit system is made of several parts as shown in FIGS. 3-4. The replacement fixture cover 14 is made up of a formed plate, which conforms to the shape of the existing fixture box 7, and acts as a replacement cover. The fixture cover 14 has a center section 13 and an outer flange 15 that extends from each side of the center section. The outer flanges are disposed to engage the sidewalls 6 of the fixture box 7. The outer flange 15 is used to mount the fixture cover 14 on the existing fixture box. Several styles of these covers would allow for the ability to retrofit essentially every 8 foot, F96 T12 and F96 T8 fixture currently in use. A mounting bracket 16 is used to attach each T-5 dual pin socket 26 to the replacement cover. Each bracket 16 is interchangeable to allow uniformity. Each bracket 16 has end sections 17 that overlap the sidewalls 6 of the fixture box 7. Alternately, the new fixture cover 14 may be installed without brackets, by attachment directly to fixture box 7 using standard sheet metal screws, allowing the use of the original fixture 7 end caps. In addition, a metal reflector 18, which is solid or pierced, can be mounted on the fixture cover 14 behind each fluorescent lamp 24. Each cover 14 can accommodate several styles of screws or fasteners. These screws and fasteners may allow entry into the fixture for wiring and maintenance access. On the back of each cover there is a mounting bracket 30, which allow the mounting of the new high efficiency T5 fluorescent ballast 22. With this ballast mounted on the back of the fixture cover, the cover acts as a heat sink to dissipate heat and also allows for modular wiring harness 32 with connector sockets to quick connect or disconnect the cover with the fixture. With these quick connect components the system would use a custom designed multipurpose wiring harnesses 32 that would act to connect the new retrofit ballast 22 and dual pin sockets 26 to the power supply, and to allow quick disconnect for these components as well. Any cover could be connected to a grounding cable if code so proscribed.

Dual pin sockets 26 can also be directly mounted on the replacement fixture cover 14 to mount and operate the new T5 fluorescent tubes 24. In this example, two T5 lamps 24 are mounted on each 8 foot original fixture body 7.

From creating and the operation of actual in-lab retrofit test kits and retrofit fixtures, it was discovered that the actual product performed better than anticipated. The retrofit kit product exceeded the illumination expectation, when measured at the user surface.

For this reason, it is now known that in applications in which there are contiguous rows of fixtures using two tubes of T8 or T12 fluorescent lights, the retrofit kits can be installed as in the original concept, or can also be installed in a second manner, less costly to operate. This second example is designed to allow the use of fewer of the 4 foot T5 lamp covers, in the retrofit process.

In the previous description, the new covers 14 using T5, 54 watt lamps, are placed end to end continuously, replacing the dual 8 foot lamp concept, in the original T8 and T12 fixtures.

In this second configuration, as shown in FIGS. 5, 5A, 5B, and 5C the same disassembly process is performed, and the same ballast and tubes are retrofitted, with a major exception: The number of lamps and ballasts are reduced in this alternate configuration.

In these alternate kits, the T5 lamps 24 are still installed on the old fixture box 7 in line, but with a decided difference. They are no longer installed continuously end to end, but have spacers 36 between them to reduce the number of lamps, which in turn reduces the number of lumens reaching the surface, at user level. These alternate retrofit kits incorporate a combination of "operative panels" and "non-operative panels". The spacer panels 36 are called "non-operative panels", and have no added operational sub-assemblies. The panels 38, with assemblies attached, are a combination of the fixture cover 14, optional reflector 18, and dual pin sockets 26 as well as T5 lamps 24 and are called "operative panels". The panels 38 are essentially similar to the fixture covers 14 previously described.

These non operative panels 36 range in length from as little as 6 inches long to as much as 24 inches long and are approximately 4 to 5 inches wide, depending on the width of the fixture box to be retrofitted. The operative panels 38 are approximately 48 inches long. These operative panels 38 are installed on some of open fixtures to be retrofitted, aligned between the non-operative panels 36 bridging across fixtures mounted contiguously, which varies from the manner previously described.

This second configuration reduces the number of T5 lamps, T5 dual pin socket connectors, and new electronic ballasts even further, than in the original concept. Light levels can remain at or near the original fixture levels before retrofitting, or be adjusted up or down, with this method. The length of the non-operative panels 36 used is calculated to be effective for any needed light level. At the user surface, the light levels can be decreased or increased, through the use of, or absence of, these non-operative panels, during retrofit.

This retrofit system works to allow safe and fast retrofit of inefficient T12 and T8 96 inch fixtures, to save time and ongoing energy usage. The custom cover 14 or the operative panels 38 and their subcomponents, act to reduce installation time, reduce energy use, and reduce ongoing maintenance. The combination of new electronic ballast, lamps, connectors, wiring harness, and custom cover configurations all work in unison. The use of non-operative panels 36 is discretionary, based on the installation requirements, and light levels sought.

The replacement cover 14 or operative panel 38 may hold T5 lamps of varying lengths and wattages to affect certain lighting patterns and attain certain specifications for the fixture in performance or aesthetics. The cover 14 or operative panel 38 may also completely encase the original fixture body 7 for aesthetic or functional reasons, depending on use or environment.

The new replacement cover 14 or operative panel 38 may be customized in several ways to improve aesthetics and to allow wider usage. The cover or operative panel may be curvilinear to improve reflectivity of the light to the surface of use. It may also have a mirror finish or a removable reflector for the same purpose. In addition, it may have additional lamps mounted on the cover to allow it to be used to create more light, which may be needed in a plant growing or agricultural usage. It may also be made with seals and shields on the lamps to protect them from wind, water or other natural or unnatural external elements.

Figure 5:
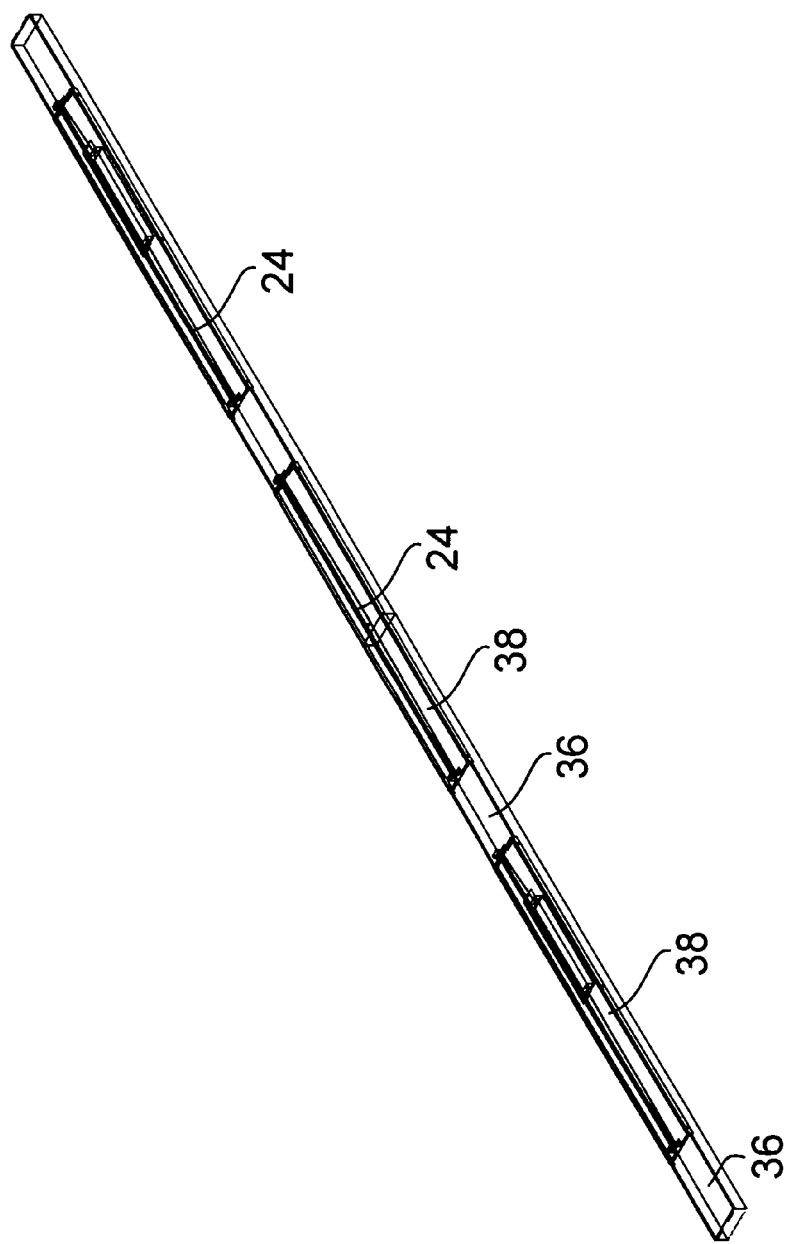
FIG. 5 is a perspective view of a light fixture with additional features that can be used with the invention.
Figure 5A:
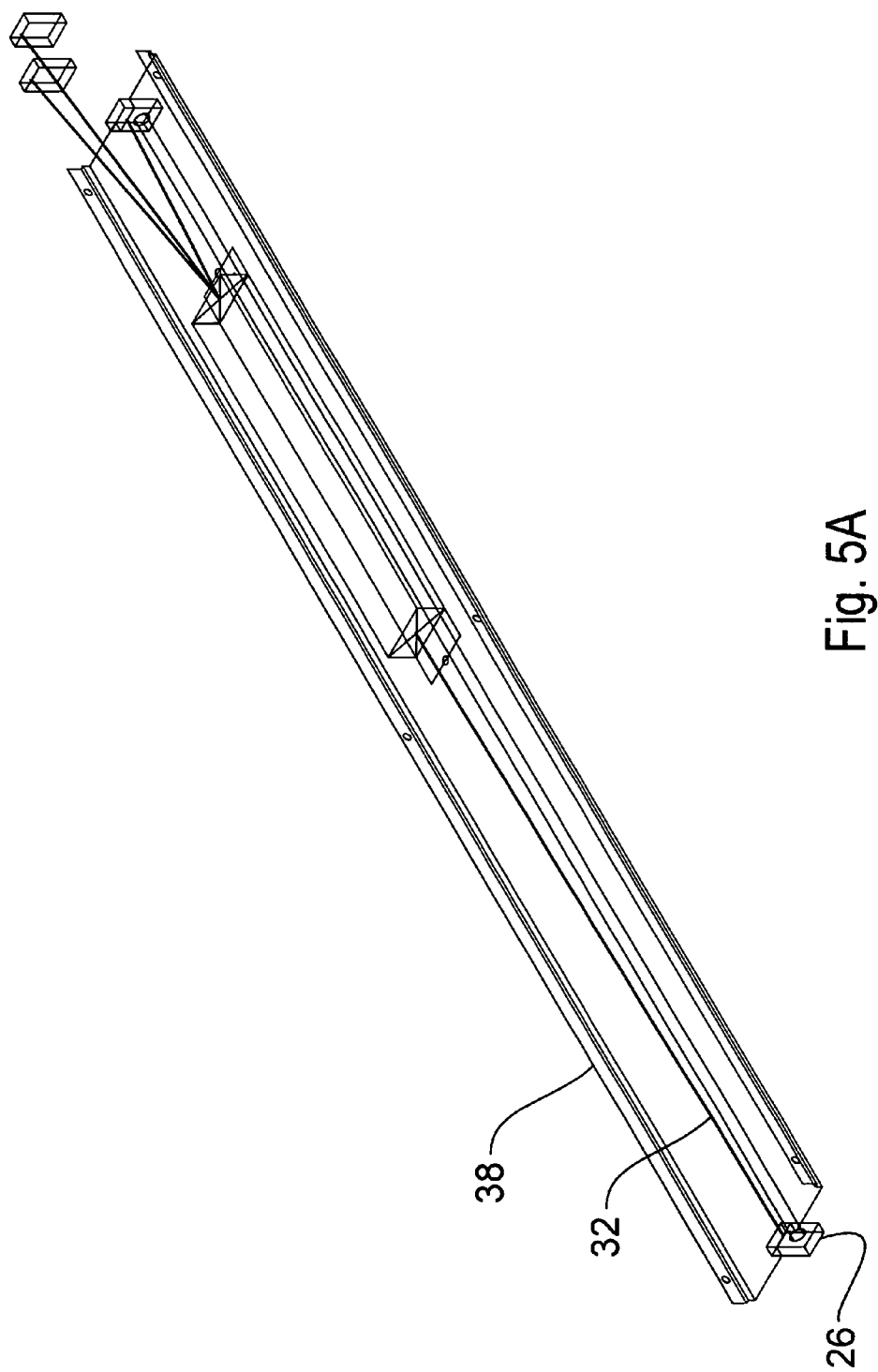
FIG. 5A is a perspective view of a replacement operative panel that can be used in the present invention.
Figure 5B:
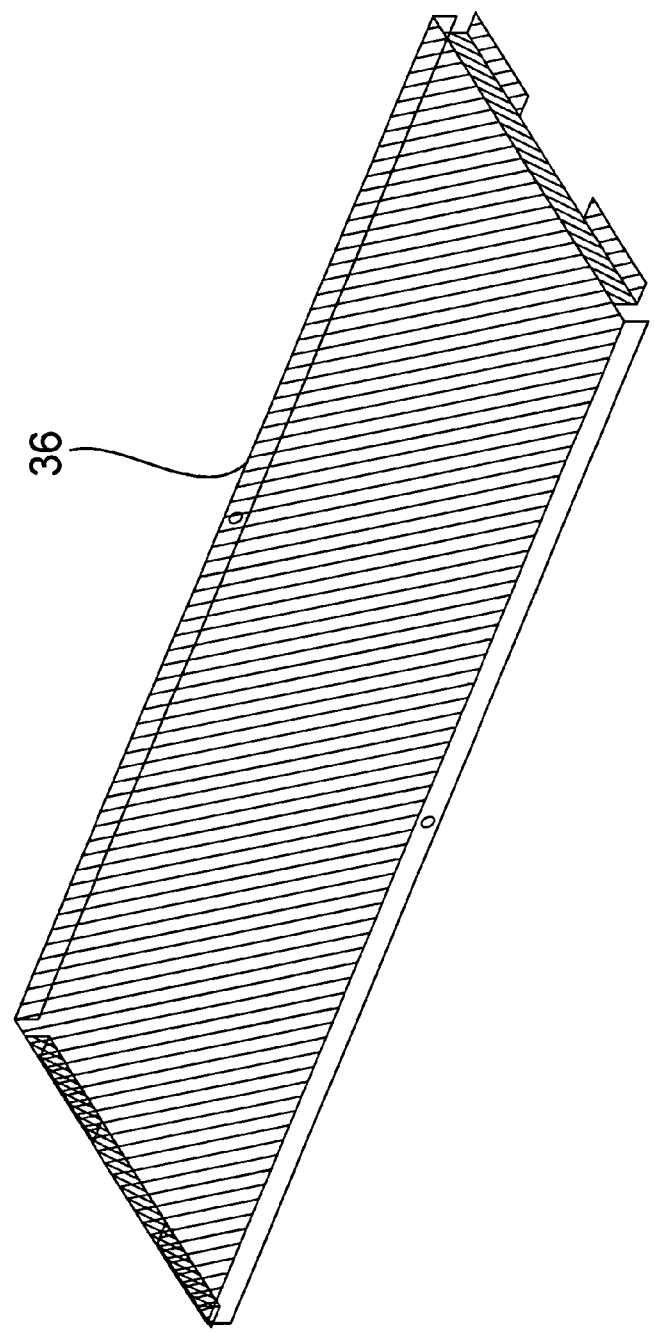
FIG. 5B is a perspective view of a replacement non-operative panel that can be used in the present invention.
Figure 5C:
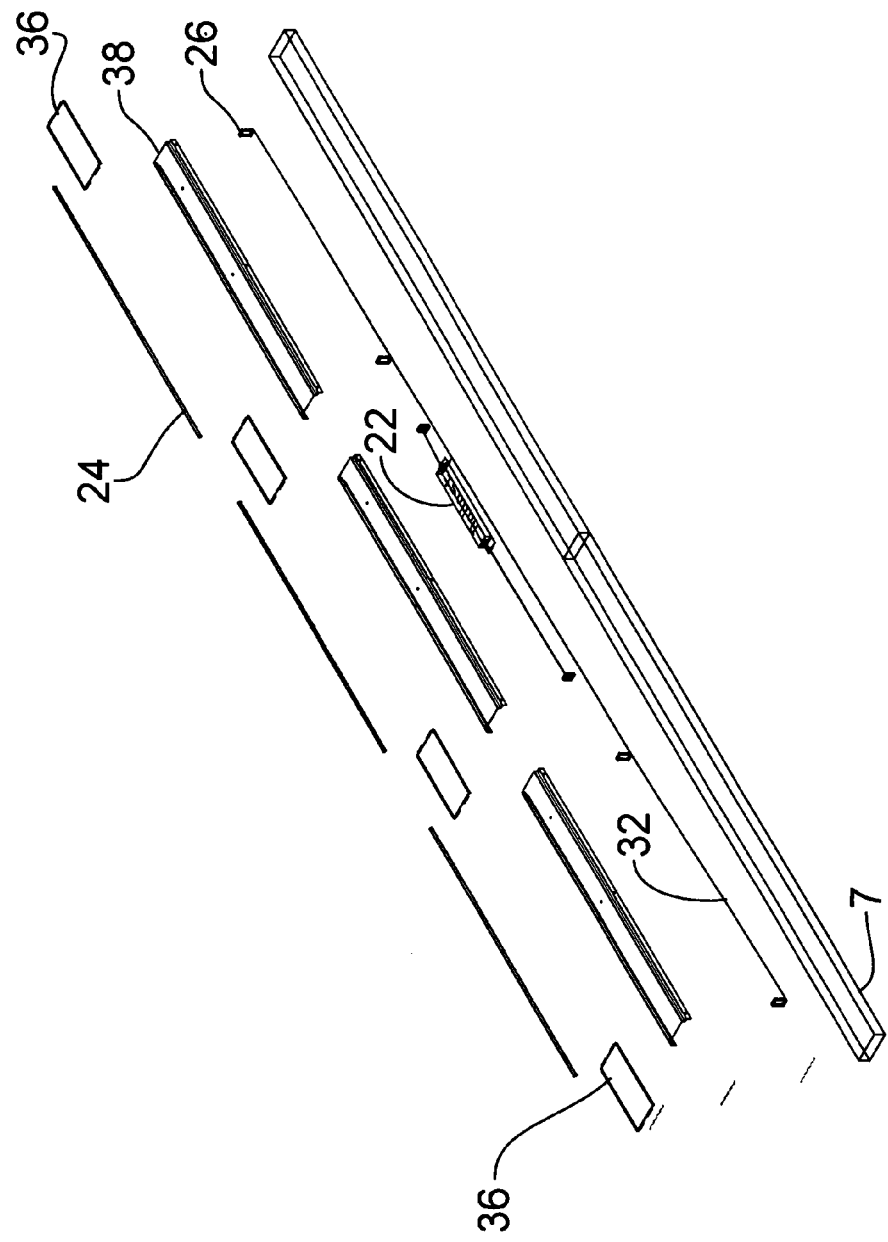
FIG. 5C is a perspective view of an assembly of panels and components that can be used in the present invention.

An additional example of a way to design the operative panels, and non-operative panels is shown in FIG. 5A and FIG. 5B. FIG. 5A shows an operative panel that is able to be attached to the original fixture body 7 without the use of additional brackets 16. In addition, the T5 dual pin lamp holders 26 are built into the operative panel and not mounted on a separate bracket. FIG. 5B shows a non-operative panel that can be attached to the original fixture body 7, without the use of additional brackets 16. FIG. 5C shows the alternate operative and non-operative panels and assemblies in a perspective drawing, as one example of a way they may appear in an installation after retrofit.

The kit and method in this invention can also be used to retrofit a 24 inch by 48 inch (two foot by four foot) troffer style light fixtures, as well as 24 inch by 24 inch (two foot by two foot) troffer style light fixtures using the original fixture shell and lens, and installing a set of ceramic sockets, compact fluorescent lamps, specialized channels, and customized wiring harnesses.

The original fixture architecture in the 24 inch by 48 inch (two foot by four foot) design allows for four T8 or 4 T12, 48-inch (nominal) lamps, mounted side by side in the fixture. As an example, the F32 T8, or the F40 T12 lamps are generally found in these fixtures. Each fixture has eight of the clamp type dual pin lamp holders, and 2 ballasts, usually either magnetic, or electronic. In addition, each fixture has a diffuser lens or diffuser grid covering the lamps. The diffuser is the same approximate size as the fixture itself, and may have been placed in service with a frame mounting, or a rail mounting, system.

Figure 6:
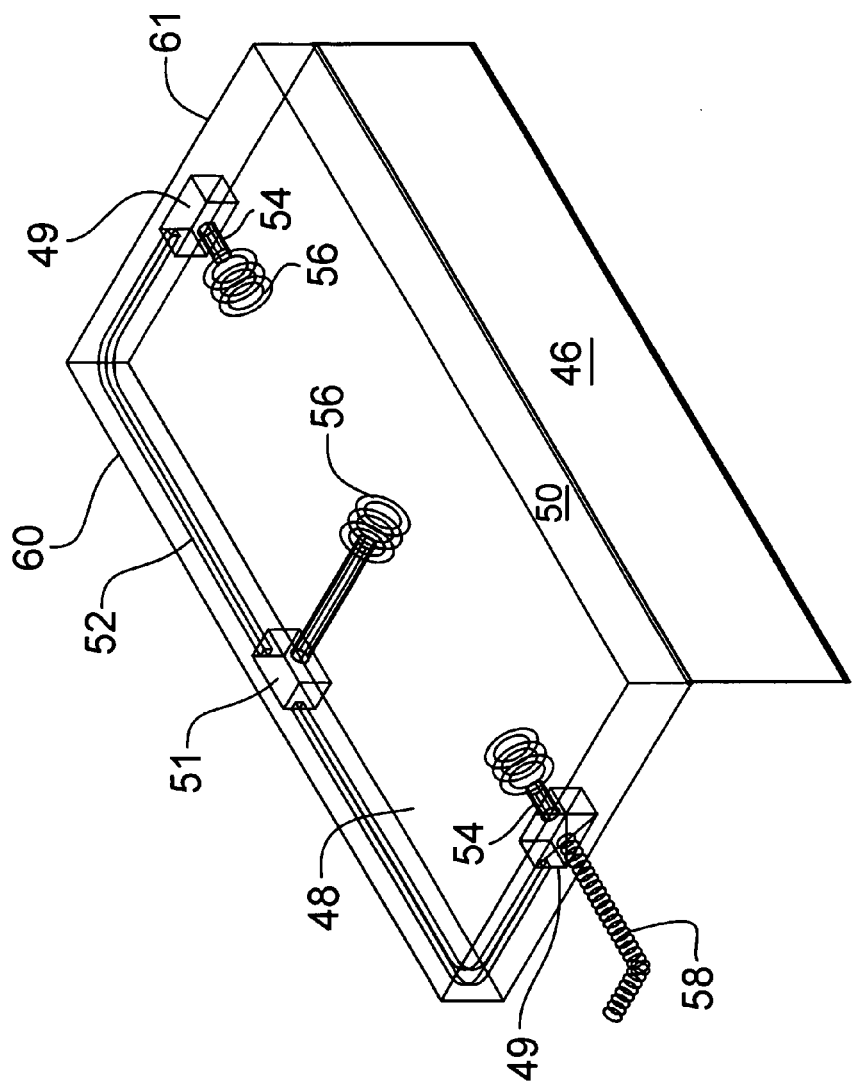
FIG. 6 is a perspective view of the light fixture of the present invention, when applied to troffer light fixtures of the 24 inch by 48 inch (two foot by four foot) fixture design, primarily installed in suspended ceiling applications.

Retrofitting a 24 inch by 48 inch (two foot by four foot) rectangular drop-in troffer style light fixture 50, as shown in FIG. 6 begins as the fixture was originally installed. The fixture has a rectangular fixture box 48 and a removable fixture cover 46. In this configuration, the fixture generally has a magnetic or electronic lighting ballast, a ballast cover, eight lamp holders, and four fluorescent lamps, as is well known in the light fixture art. The fluorescent lamps are usually rated at 32 to 40 watts each, and measure about 46 inches from electrode to electrode. They are normally described as T12 or T8 lamps. Energy use to illuminate these lamps is approximately 140 to 175 watts per fixture, when lit.

In this example, the retrofit kit for this installation has a custom wiring harness 52, a three position wiring box system 51, three ceramic sockets 54, and three compact fluorescent lamps (CFL) 56. There are several benefits, attained by the facility operator in using this kit, including savings in maintenance, parts replacement, and operational cost.

In this process, each fixture box 48 and diffuser lens 46 remains in place and the internal operational parts are removed and recycled. The removed parts include the ballast, lamps, sockets, and ballast cover. An advantage is that the fixture box 48 is reused, not land filled. The empty fixture, with the lens retained, is completely cleaned out and wiped down to create the highest possible reflective surface remaining. The diffuser lens is completely cleaned as well. Ceramic fixture sockets 54 are mounted into a custom wiring harness 52 and wiring boxes 51, the first or primary designated wiring box, is wired to the electrical feed 58 already in place, to provide power. The other two boxes 51 are powered from the wiring harness. Three compact fluorescent lamps 56 are placed in the fixture sockets 54 and lens is closed. Light reaching the surface is dependent on the compact fluorescent lamp size installed. Reduction in the wattage of the compact fluorescent lamps will reduce light output, which may be desired in fixtures burning 24 hours a day. In general, the overall energy used to run the fixture is reduced, as is the commercial power demand factor, when compared to the original installation.

Maintenance is also reduced. The fixture requires fewer fixture entries for lamp replacement, and much easer replacement of lamps can be done once inside the fixture. With the new retrofit kit in place, if one lamp fails, the balance of the lamps remain fully lit. This eliminates the need for "on demand " maintenance caused in standard 4 lamp troffer fixtures, as when a lamp fails in the standard fixture, the fixture often dims, flickers, or buzzes. In addition, with the new kit in place, the fixture never requires rewiring due to ballast failure, after retrofit, as there is no freestanding ballast in the new configuration. Lamp replacement cost is reduced, and simplified. Additional measurable savings is attained, as a maintenance crew can do the retrofit, and ongoing service, in most cases. In this example, the ceiling remains undisturbed. In a fixture replacement scenario, the ceiling may require additional repair and/or replacement, when these fixtures are moved, or disturbed.

Before the retrofit begins, the power is shut off and the circuit breaker for the lights is blocked and tagged At this point the power feed conduit 58 may already be in place, entering the fixture through a fixture end knock out plug 49. It is also possible that the feed conduit can be attached to the top plate of the fixture and, if so, it may need to be moved to the closest fixture end knockout plug, before proceeding. In many cases the power feed will be a flexible conduit, with insulated three, or four, conductor, wire. This configuration allows the use of either of the knock out plugs on the fixture end cap, for retrofit.

After properly locating the power feed, the provided retrofit kit electrical harness 52 and boxes 51 are mounted onto the sidewall 60 and end walls 61 of the fixture. The power feed will enter through one of the chosen knockout plugs for this application. The kit includes all needed fittings and attachments, as well as the box covers, ceramic sockets, wiring harness, and grounding strap.

The three or four conductor wires are fed into the designated primary wiring box 51 provided, and wired to the wiring harness provided, using wire nuts that are provided in the kit. The other two wiring boxes 51 do not require additional power feeds as they are already wired to the wiring harness 52. To finish the installation, the ground wire is affixed to the flexible conduit in place, or to the green ground wire coming in the wiring feed.

The cover on the primary designated wiring box is then refitted. The sockets are tested for continuity and grounding, and three compact fluorescent lamps are placed in the sockets. The diffuser panel is closed, and the retrofit is now complete.

The three 26 watt CFL lamps provide the approximate equivalent of 300 watts of incandescent lighting. Alternate compact fluorescent lamps can be chosen in the 14 to 18 watt range, which creates an approximate equivalent illumination to lamps rated at 60 watts to 75 watts of incandescent illumination. A smaller wattage compact fluorescent lamp may be chosen if lower light levels are desired, or additional savings are sought. Alternately, larger wattage lamps may be chosen, where more light is needed for specialized tasks.

Figure 8:
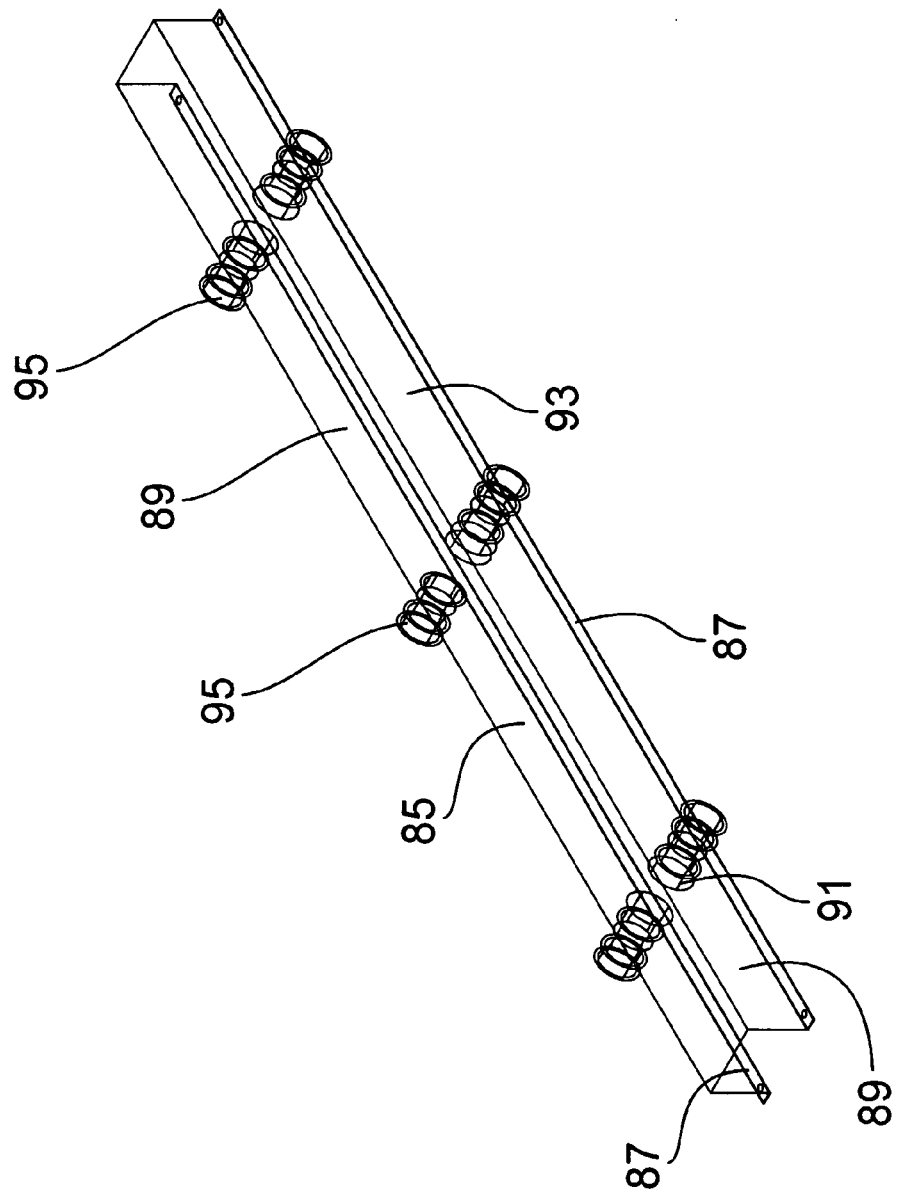
FIG. 8 is an exploded perspective view of the internal power bar component of the present invention, when applied to troffer light fixtures of the 24 inch by 48 inch (two foot by four foot) fixture design.
Figure 8A:
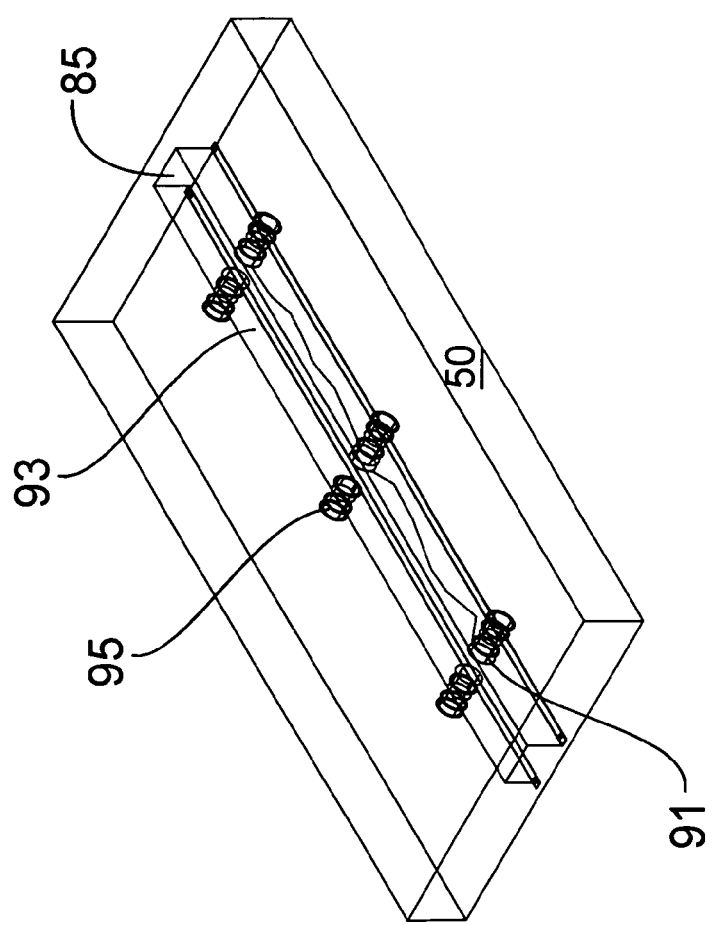
FIG. 8A is an exploded perspective view of the light fixture of the present invention, when applied to troffer light fixtures of the 24 inch by 24 inch (two foot by four foot) fixture design.

As an alternate installation for the 24 inch by 48 inch (two foot by four foot) troffer retrofit kit, a second design element is described. In FIG. 8 and FIG. 8A the same method and benefits previously described are expanded in this alternate installation. FIG. 8 shows a u-shaped power bar 85 that can be used with the kits of the present invention. The retrofit kit feature is used with the light fixture box 48 shown in FIG. 6 as described above. First the supply power is locked out, the internal parts are removed, and the box 48 and diffuser 46 (if present) are cleaned, before the installation of the retrofit kit begins. The power bar, a u-shaped insert 85, is positioned in the fixture box 48. The power bar u-shaped insert 85 has a flange 87 that extends from each leg 89 of the insert. The flange 87 is designed to engage the base of the fixture box 48. Suitable securing means such as screws, glue or welding can be used to secure the power bar u-shaped insert 85 to the base of the fixture box. A plurality of ceramic sockets 91, are positioned on each of the legs 89 of the insert. The quantity of said ceramic sockets may vary, based on light requirements, in any specific installation. A wiring harness 93 is positioned between the legs 89 of the insert and operatively connected to the ceramic sockets 91. The custom wiring harness 93 is also secured to the power supply wire that is used to supply power to the light fixture box 48, using the original upper housing entry cover, and original supply wiring. No shifting of the original power supply is necessary in this example. A compact fluorescent lamp 95 is positioned in each ceramic socket 91 to provide illumination to the desired level. The compact fluorescent lamps 95 replace the less efficient fluorescent tube type of lights previously used. If the light fixture 50 has a lens or cover 46, such lens or cover can be repositioned on the light fixture after the installation of the insert and fluorescent lamps is completed. The power bar u shaped insert 85 and compact fluorescent lamps 95 have the same installation and operational efficiencies as previously discussed with other replacement components previously discussed. FIG. 8A shows the power bar 85 installed in the fixture box 48, with six ceramic sockets and compact fluorescent lamps present in this example. Other examples may have fewer ceramic sockets and lamps installed on the power bar 85, to vary desired light levels.

Figure 7:
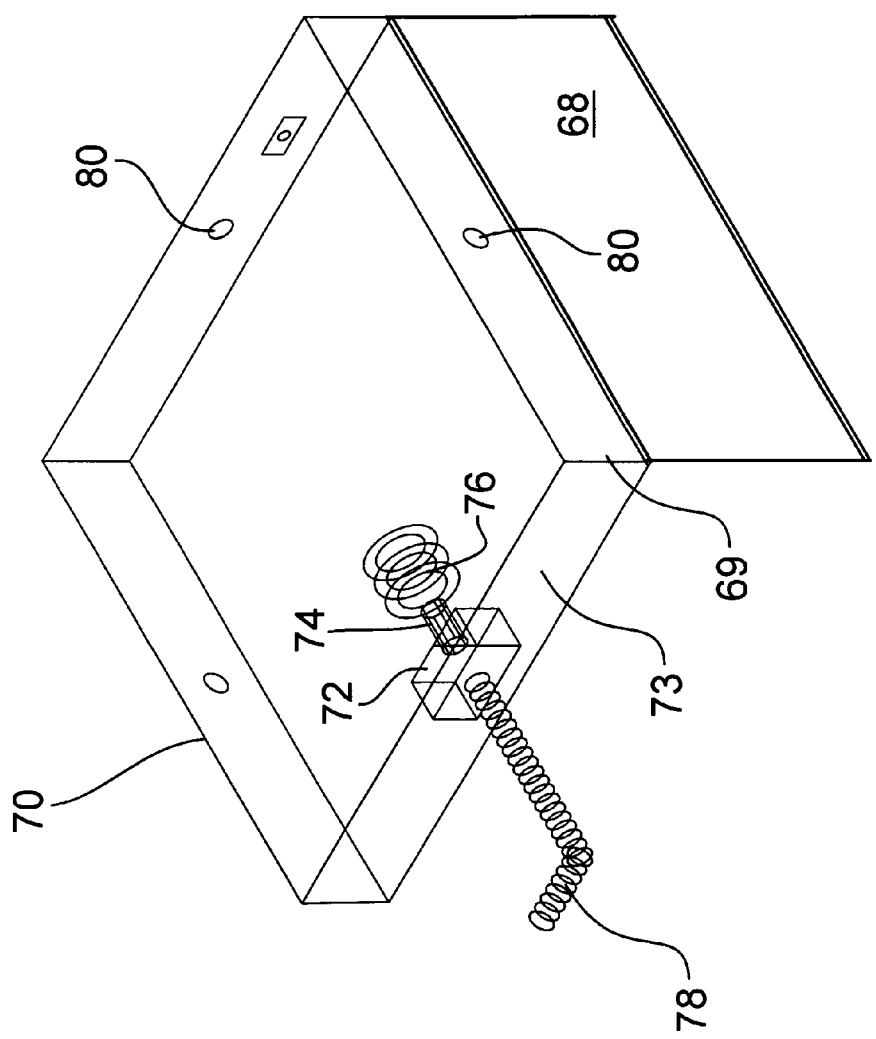
FIG. 7 is a perspective view of the light fixture of the present invention, when applied to troffer light fixtures of the 24 inch by 24 inch (two foot by two foot) design, primarily installed in suspended ceiling applications.

The kit and method of this invention can also be used to retrofit a 24 inch by 24 inch (two foot by two foot) troffer style light fixture 70, using the original fixture box 69 and diffuser lens 68, if present, and installing a single 26 watt nominal compact fluorescent lamp 76 and electrics 72, 78 as shown in FIG. 7.

Retrofitting a 24 inch by 24 inch square (two foot by two foot) fixture 70 begins as the fixture was originally installed. In this configuration, the fixture generally has a magnetic or electronic lighting ballast, a ballast cover, two mounting posts, four lamp sockets, and two U-line fluorescent lamps. These lamps are usually rated at 32 to 40 watts each. Energy use is approximately 75 to 90 watts per fixture, when lit. Some fixtures may have straight fluorescent lamps, as an alternate to the U shaped lamps described here, and their wattage may vary in that case.

When retrofitted with a custom wiring box 72, ceramic socket 74, and a compact fluorescent lamp 76, there are several benefits, attained by the facility operator. These include savings in maintenance, replacement, and operational cost centers as previously described.

The installation is similar to the installation previously described. The empty fixture 69, with the lens 68 retained, is completely cleaned out and wiped down to create the highest possible reflective surface remaining. A fixture socket 74 is mounted into a custom wiring box 72, and the box is mounted on the sidewall 73 of the interior surface of the fixture. A socket 74 is wired to the electrical feed 78 already in place. A 26-watt compact fluorescent lamp 76 is placed in the socket, and the lens 68 is closed. Light reaching the surface is regulated through the wattage of the lamp chosen for the application. Compact fluorescents can be chosen in a range of colors and wattages. The energy used to run the fixture is dramatically reduced. Maintenance is reduced, as the fixture requires fewer fixture entries for lamp replacement, as there is only one lamp, not two. In addition, the fixture never requires rewiring due to ballast failure, after retrofit, as there is no freestanding ballast in the new configuration, to fail. In addition, the 26 watt compact fluorescent lamp has a lower acquisition cost, than the U line lamps it replaces. An additional measurable savings is attained as a maintenance crew can do the retrofit. The light fixture is not removed, only upgraded; saving both the time and money associated with fixture or lamp replacement, by off staff personnel. Maintenance is reduced as fewer fixture entries are necessary after the retrofit process, to maintain the system. Due to the close proximity of the lamps, the ballast and the lens, the lamp life is often shortened in this U line lamp style fixture, in its original design, due to overheating in the enclosure. With the retrofit kit, this problem does not occur.

At this point the power feed conduit 78 may already be in place, entering the fixture through a side-hole knock out plug 80. It is also possible that the conduit will be attached to the top plate of the fixture. If this is the case, the wiring feed may need to be moved to the side hole knockout plug, before proceeding. In many cases the power feed 78 will be a flexible conduit, with insulated three, or four, conductor wire. This configuration allows the use of any of the side hole knock out plugs present, 80 for retrofit. The kit includes all needed fittings and attachments, as well as the box cover and ceramic socket, and grounding strap.

The three, or four, conductor wires are fed into the box 71 provided, and wired to the ceramic socket 74, to the wiring harness provided in the kit. The ground wire is affixed to the flexible conduit in place, or to the green ground wire coming in the wiring feed as is well known in the art.

The cover is fitted to the wiring box 72, and the socket and box are tested for continuity and ground. The 26-watt compact fluorescent lamp 76 is placed in the socket. The diffuser panel or lens 68 is closed, and the retrofit is now complete.

Figure 9:
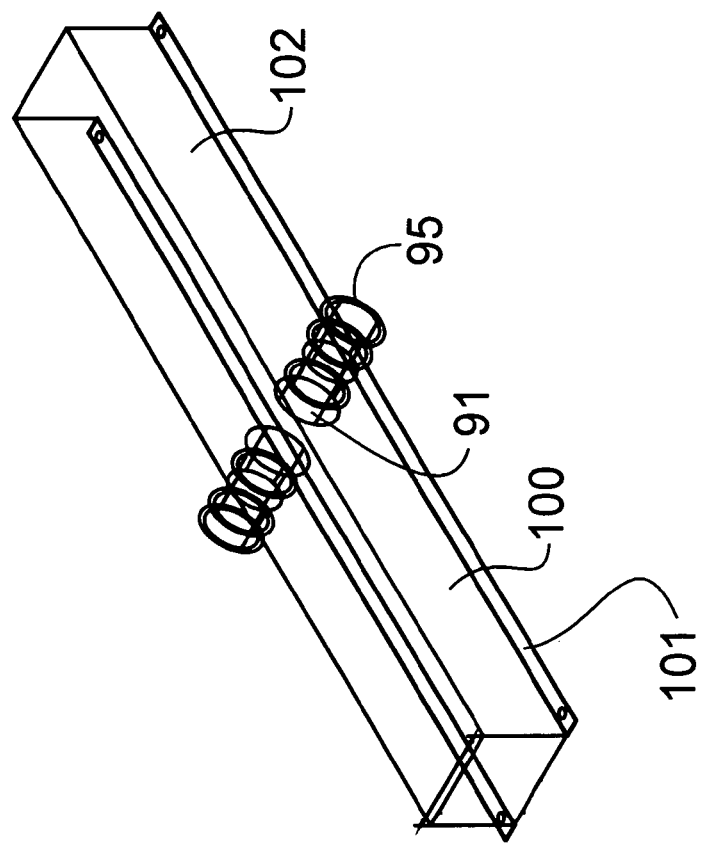
FIG. 9 is an exploded perspective view of the internal power bar component of the present invention, when applied to troffer light fixtures of the 24 inch by 24 inch (two foot by two foot) fixture design.
Figure 9A:
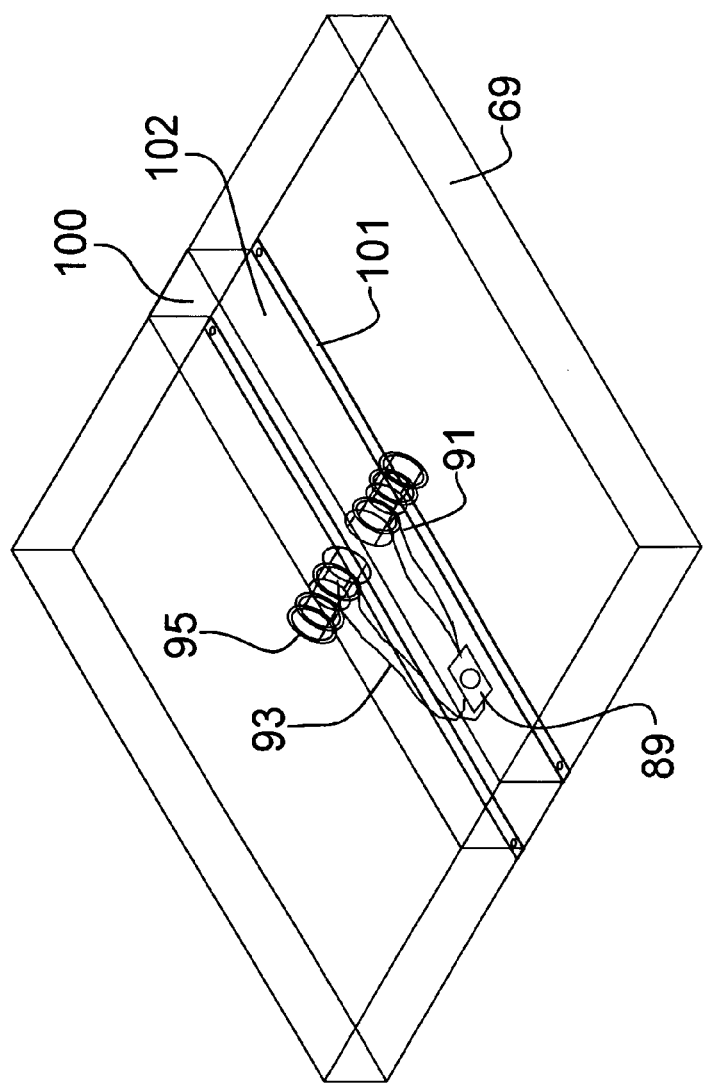
FIG. 9A is an exploded perspective view of the light fixture of the present invention, when applied to troffer light fixtures of the 24 inch by 24 inch (two foot by four foot) fixture design.

As an alternate installation in the 24 inch by 24 inch (two foot by two foot) troffer fixture retrofit kit, a second possible design element is described. In FIG. 9 and continued in FIG. 9A. The installation is similar to the installation previously described. The empty fixture box 69, with the lens 68 retained, is completely cleaned out and wiped down to create the highest possible reflective surface remaining. The same method and benefits previously described are expanded in this alternate installation. FIG. 9 shows a custom power bar that can be used with the kits of the present invention. As described above, the power is locked out, the internal parts are removed, and the fixture box 69 and diffuser lens 68 (if present) are cleaned, before the installation of the retrofit kit begins. The power bar, a u-shaped insert 100, is positioned in the fixture box 69. The power bar u-shaped insert 100 has a flange 101 that extends from each leg 102 of the insert. The flange 101 is designed to engage the base 75 of the fixture box. Suitable securing means such as screws, glue or welding can be used to secure the power bar u-shaped insert 100 to the base of the fixture box. At least one lamp socket 91 is positioned on each of the legs 102 of the insert. Compact fluorescent lamps 95 of the desired wattage are chosen and installed. A wiring harness 93 is positioned between the legs 89 of the insert and operatively connected to the ceramic sockets 91. The wiring harness 93 is also secured to the power supply wire that is used to supply power to the light fixture 69, using the original upper housing entry cover, and original supply wiring. No shifting of the supply wiring is required in this example. A compact fluorescent lamp 95 is positioned in each ceramic socket 91 to provide illumination for the light fixture 69. The compact fluorescent lamps 95 replace the less efficient fluorescent tube type of lights previously used in the light fixture 69. If the light fixture 69 has a lens or cover 68, such lens or cover can be repositioned on the light fixture after the installation of the insert and fluorescent lamps is completed. The power bar u-shaped insert 100 and compact fluorescent lamps 95 have the same installation and operational efficiencies as previously discussed with other replacement components previously discussed. FIG. 9A shows the power bar 100 installed in the fixture box 69, with two ceramic sockets 91 and two compact fluorescents 95 present, in this example.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. A retrofit lighting device kit for mounting in the existing troffer style fixture having a top mount electrical feed and fluorescent tube style bulbs, the device comprising:

a central u-shaped channel having a base and legs that extend from the base in opposed relationship and a flange extending from the end of each of the opposed legs that is spaced apart from the base;

a plurality of holes on each of the flanges a plurality of fasteners corresponding to the holes and securing the u-shaped channel to a top side of the troffer;

a plurality of ceramic sockets, positioned on each leg of the u-shaped channel;

a plurality of compact fluorescent lamps mounted in each of the ceramic sockets;

a hole in the u-shaped channel that receives the top mount electrical feed;

a wiring harness positioned in the u-shaped channel and connected to the ceramic sockets and the top mount electrical feed.

2. The retrofit lighting device kit of claim 1 wherein a lens is positioned on the lighting fixture to defuse diffuse light from the high efficiency lamps.

* * * * *